Figure 4:
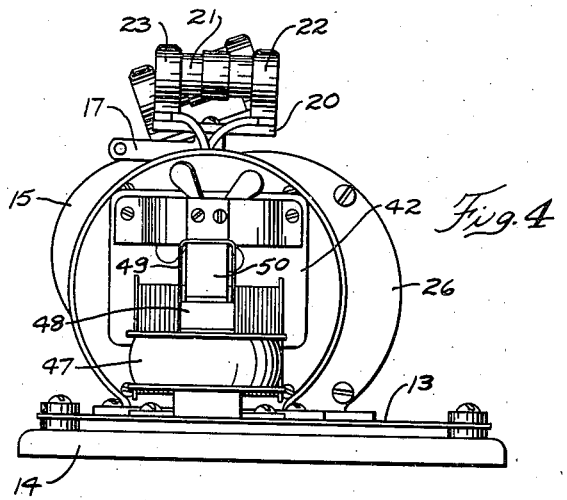

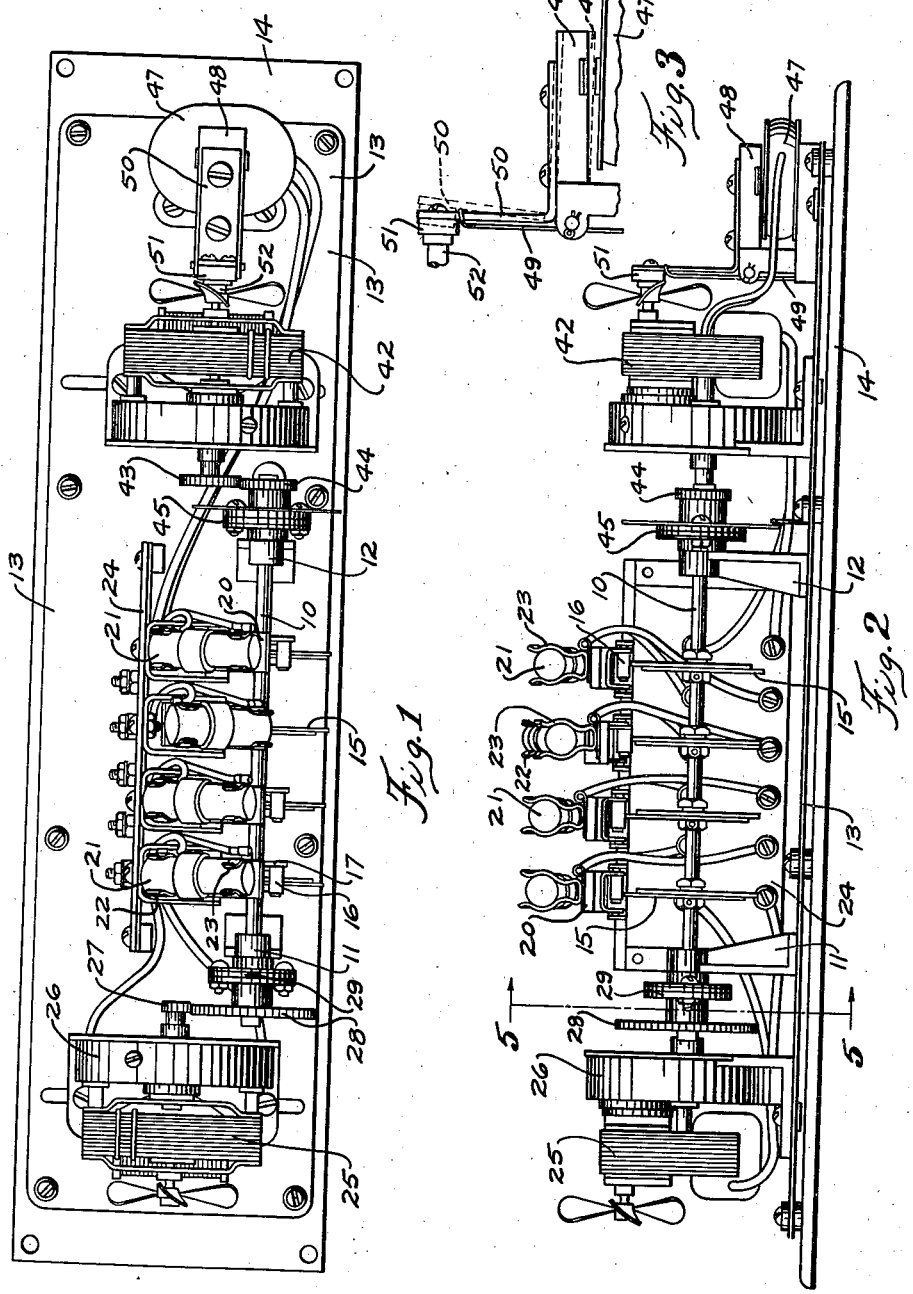

Dec. 30, 1941.    J. H. STALEY    2,267,843
TIME CYCLE CIRCUIT CONTROLLER
Filed May 10, 1939    2 Sheets-Sheet 2

INVENTOR
JOSEPH H. STALEY,
BY Minturn & Minturn,
ATTORNEYS

Patented Dec. 30, 1941

2,267,843

UNITED STATES PATENT OFFICE 2,267,843

TIME CYCLE CIRCUIT CONTROLLER

Joseph H. Staley, Columbus, Ind.

Application May 10, 1939, Serial No. 272,855

2 Claims. (Cl. 200—32)

This invention relates to means for controlling one or more electric circuits where those circuits are to be operated in a time sequence in accordance with a predetermined program. The subject matter of the invention is generally termed a time cycle controller. The invention finds use in definite cycling operations, such as the sequence operations of machines, operations of solenoids, magnets, motors, lamp circuits, and the like.

The invention includes a cam shaft having a separate drive on each end through two overrunning clutches. A high speed geared motor drives the shaft through one of the clutches and a low speed geared motor drives the shaft through the other clutch. The cam shaft carries adjustable cams operating electric switches, the switches in the present showing consisting of mercury tube switches. One or both of the driving motors may be equipped with an electromagnetic brake to stop them instantly and eliminate coasting where close timing is desired. The motors may be operated by remote control switches or may be automatically operated by switches operated by the cams of the controller.

The controller is built to control any desired number of circuits and is adapted to an extremely wide range of complicated control operations involving recycling, time delay, or adjustable time of operation in any one or more increments of the cycle without changing the other increments. In most timing programs, the low speed motor may be run constantly and the high speed motor picks up the drive of the cam shaft through its overrunning clutch at predetermined intervals. When the high speed motor stops, the low speed motor continues the controller operation or program at the slow speed. This particular manner of operation may be used in advancing the controller quickly to zero position and then bring it to a stop, or it may be used for shortening one or more intervals of the program. In such operation, the program for operation of the switches from the cam shaft is laid out on the low speed motor operation. Of course, with the reverse operation where the program is carried principally by the high speed motor, the low speed motor may then be used for time delay to give a long interval of time between operations.

An important advantage of the invention is that the controller when used as a recycling controller does not run through all of the operations in reverse in order to resume the start position. It may handle many program jobs heretofore requiring a continuous duty time cycle controller which in turn was controlled by several other recycling controllers. My controller gives the combined operation of two separate controllers running at different speeds which may be pre-selected.

Other important advantages of the invention are many. As just indicated, the actual operation may be performed either by the low speed or the high speed motors, and in either case the timing interval desired to be adjusted is shortened or extended by cutting in the motor normally not carrying the load. The controller being equipped with motors having predetermined differences in final drive speeds, may be operated by a remote control switch to operate at either of the two motor speeds on the overall timing.

Where it is desired to quickly adjust certain cycles of operation, particularly those of time delay, or it is desirable to adjust an individual period of operation without affecting any other period, two or more circuits of the controller may be connected in parallel to the high or low speed geared motor and the individual cams adjusted for the particular operation without affecting the timing of other operations.

A particular advantage of the controller is that it is capable of handling short cycle operations following a long period of inoperation. Many automatic control operations have heretofore been found to be impracticable on account of the impossibility of laying out the timing on cams so as to obtain several short operations in a long period, such for example as one minute each in a period of two hours. This type of operations is handled by my controller by the use of a high speed geared motor which will go through these operations in approximately one-half of a revolution of the cam shaft. At the end of that time, the high speed geared motor is stopped and the low speed geared motor carries the controller on through the balance of the revolution at a very slow speed to give the desired long time delay.

It is to be particularly pointed out among the many advantages of my invention that through the use of the separate overrunning clutches, the controller before being started may be advanced manually to any desired position so that operations will start at a fixed predetermined period. The slow speed geared motor may be stopped and is not driven nor any drive taken through it when the other motor picks up the drive. Each motor drives the shaft independently of the other, that is the drive of one motor at no time is taken through the drive of the other motor nor through any of the intermediate gearing of the other motor.

Figure 6:
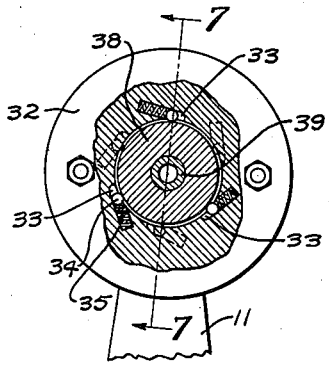
Figure 5:
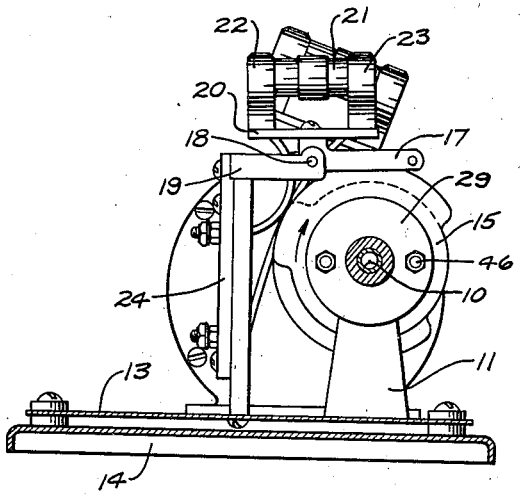
Figure 7:
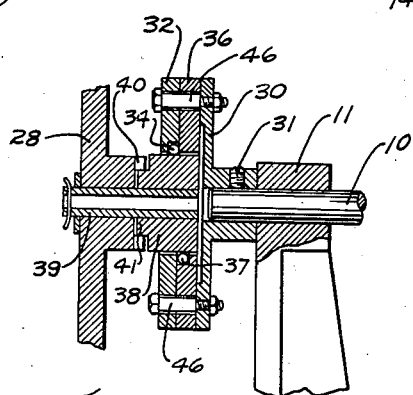

These and many other advantages of the invention, including the adaptability to interchange of parts for modifying a program quickly and easily, will become apparent to those versed in the art in the following description of one particular form of the invention as illustrated by the accompanying drawings, in which Fig. 1 is a top plan view of a structure embodying the invention;

Fig. 2, a rear elevation;

Fig. 3, a detail in rear elevation on an enlarged scale of the magnetic brake;

Fig. 4, an end elevation;

Fig. 5, a transverse vertical section on the line 5—5 in Fig. 2;

Fig. 6, a detail in enlarged end elevation in partial section of an overrunning clutch; and Fig. 7, a detail in central, vertical, longitudinal section of the clutch.

Like characters of reference indicate like parts throughout the several views in the drawings.

A cam shaft 10 is supported by bearings in standards 11 and 12 mounted upon a base plate 13 supported by the base 14. One or more cams 15, herein shown as four in number, are adjustably fixed on and driven by the shaft 10. In the path of each of these cams 15 is a roller 16 carried by an arm 17 which is rockably supported on a pin 18 by a bracket 19, Fig. 5. The arm 17 carries an insulating block 20 which in turn carries the mercury switch 21 mounted between clips 22 and 23. The structure so far described is shown and described in more detail in my U. S. Letters Patent No. 2,141,024, issued December 20, 1938. Each of the cams 15 is made of two disks with cut away peripheral portions whereby the disks may be revolved circumferentially about the shaft 10 to give the desired contour length for lifting of the arm 17.

The bracket 19 in each instance is supported on an insulating panel 24, this panel 24 serving as a terminal panel to which leads are carried from the individual switches 21 for circuit connections.

At one end of the cam shaft 10 is mounted an electric motor 25 to be shiftably carried on the base plate 13. The motor 25 may take any one of the many forms, but in any event is interconnected with the shaft 10 through reduction gearing so that the shaft 10 may be driven at the slowest speed required. In the form herein shown, a gear box 26 is employed to reduce the speed of the motor armature down to the speed of the pinion gear 27 which is constantly meshed with the larger gear 28. Between the gear 28 and the shaft 10 is interposed an overrunning clutch, generally designated by the numeral 29.

Reference to Figs. 6 and 7 will show the details of this specific form of clutch herein shown although the invention is not limited to this exact form. On the shaft 10 outside of the standard 11 is fixed a clutch mounting plate 30, herein shown as by a set screw 31 screw-threadedly entered through a hub of the plate 30 to engage the shaft 10. A clutch plate 32 is formed to have an enlarged bore therethrough and a number of non-radial slots 33, herein shown as three in number, are formed from the inner face of the plate to open into the plate bore. In each of these slots is carried a steel ball 34 and a compression spring 35 behind the ball normally urging it outwardly toward that end of the slot 33 which opens into the plate bore. A second plate 36 is formed to be a duplicate of the plate 32.

The plate 36 is mounted to be adjacent and in contact with the face of the mounting plate 30 to have the steel balls 37 in it retained in the slots of that plate by abutting the plate 32 against the plate 36, thereby also causing the balls 34 of the plate 32 to be retained in their respective slots by that abutment. The plates 32 and 36 are circumferentially revolved one in respect to the other so as to have the balls 34 of the one plate regularly spaced between the balls 37 of the other plate. The two plates 32 and 36 are then relatively fixed to turn with the mounting plate 30 by having pins or bolts 46 passed therethrough. A clutch center 38, generally cylindrical in shape and formed with a hardened surface, is inserted into the bores of both clutch plates 32 and 36 as indicated in Fig. 7, the diameter of the center 38 being such that the balls 34 and 37 will form a wedging engagement therewith when the center 38 is turned in a clockwise direction as viewed in Fig. 6. A stub shaft 39 in the nature of a bushing is axially carried within the center piece 38 by a pressed fit and the gear 28 is carried on an extending part of this shaft 39. A driving connection is formed between the gear 28 and the center 38 in any suitable manner, herein shown as by means of a slot 40 across the hub of the gear receiving a tongue 41 of the center 38. Thus when the motor 25 is running, the shaft 10 will be driven through the clutch 29.

At the other end of the shaft 10 is mounted a motor 42, this motor being connected to the shaft 10 through the final drive gears 43 and 44 and the overrunning clutch 45. The clutch 45 is an exact counterpart of the clutch 29 and is assembled so that its center will drive the clutch plates and shaft 10 in a counterclockwise direction. The reduction gearing between the armature shaft of the motor 42 and the gear 44 is made to be such that the motor 42 will drive the shaft 10 at a higher rate of speed than does the motor 26 on the other end.

While both motors 25 and 42 may be equipped with a magnetic brake to stop them substantially instantaneously upon de-energization, a brake is herein shown as being applied only to the motor 42, it being more essential to stop the high speed motor than the low speed in most instances since there would normally be a greater overrun of the drive from the high speed motor than from the low speed motor when current is cut off. The brake, in the form herein shown, consists of a magnet winding 47 to be in parallel with the circuit of the motor 42. An armature 48 is normally held in a lifted position by means of a spring 49 pulling an arm 50 upturned from the armature 48 and carrying a brake shoe 51 against the end of the motor armature shaft 52. When the motor 42 is energized, the coil 47 is simultaneously energized to pull down the armature 48 and thereby rock the arm 50 to carry the brake shoe 51 out of engagement with the end of the shaft 52 and thereby permit free running of the shaft. Immediately current is cut off from the motor 42, the coil 47 is likewise cut off and the spring 49 controls to carry the brake shoe 51 into braking position to stop the shaft 52.

Assuming, as one example, that the program for a series of operations is laid out upon the basis of travel of the low gear speed motor 25, this motor will be set in operation by a current supply controlled from any remote control switch.

This motor will run continuously until shut off by that remote control switch. When the motor 25 is thus operating, the cam shaft 10 will be turned at that predetermined speed as determined by the reduction gearing between it and the motor. The motor 42, in this example, would normally be stationary and thus the clutch plates in the clutch 45 would be running over the center of that clutch without any driving connection therewith, without any loss of power. The individual cams 15 would have been adjusted initially to give the desired timing for each of the circuits as controlled by the individual switches 21. This timing arrangement would be repeated over and over again for each revolution of the shaft 10.

Taking another example, the motor 42 may be controlled by a separate switch independently of any of the mercury switches 21 whereby the shaft 10 may be speeded up upon energizing the motor 42 to have the shaft 10 run at the higher rate of speed. This is accomplished regardless of whether the motor 25 be cut off or allowed to continue to run since the shaft 10 would then be under driving control of the motor 42 through the clutch 45 to cause the overrunning action in the clutch 29 without affecting or being affected by the motor 25. The two examples thus given would be for a remote manual control.

As another example, instead of having a remote control switch for the motor 42, the circuit for that motor may include one of the mercury switches 21 so that for a given part of any one revolution of the shaft 10 as determined by the contour of the particular switch cam 15, the motor 42 would be energized accordingly and thus speed up the shaft 10.

It is believed that the foregoing examples, while not in any way exhausting the possibilities of various controls possible, are sufficient to illustrate the extreme flexibility and adaptability of my controller.

While I have herein shown and described my invention in the one best form as now known to me, it is obvious that structural changes may be employed without departing from the spirit of the invention and I, therefore, do not desire to be limited to that precise form beyond the limitations as may be imposed by the following claims.

I claim:

1. A time cycle, multiple electric circuit controller comprising a plurality of switches, one at least for each circuit to be controlled, means including a driving motor normally operating said switches at a predetermined rate and sequence of opening and closing, a second motor, means actuated by said second motor to connect with said first means for operating all of said switches at a rate of speed differing from that resulting from said first motor operation, said second motor being controlled by one of said switches actuated initially by the first motor.

2. A time cycle, multiple electric circuit controller comprising a plurality of switches, one at least for each circuit to be controlled, means including a driving motor normally operating said switches at a predetermined rate and sequence of opening and closing, a second motor, means actuated by said second motor to connect with said first means for operating all of said switches at a rate of speed differing from that resulting from said first motor operation, said second motor being controlled by one of said switches actuated initially by the first motor, said first means being formed to control said one switch to allow said second motor to effect said change in operating speed of the first means during continuing operation of the first motor, whereby the initially arranged cycle of operations of the switches may be varied by the second motor within that cycle.

JOSEPH H. STALEY.